(12) United States Patent
Yamada

(10) Patent No.: US 6,870,561 B2
(45) Date of Patent: Mar. 22, 2005

(54) IMAGE RECORDING APPARATUS AND METHOD

(75) Inventor: Naoto Yamada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 95 days.

(21) Appl. No.: 10/086,362

(22) Filed: Mar. 4, 2002

(65) Prior Publication Data

US 2002/0140802 A1 Oct. 3, 2002

(30) Foreign Application Priority Data

Mar. 28, 2001 (JP) ........................................ 2001-092523

(51) Int. Cl.⁷ ............................................... B41J 11/00
(52) U.S. Cl. .................................................... 347/262
(58) Field of Search ................................ 347/262, 104; 271/274; 400/624, 625, 645; 226/183, 187

(56) References Cited

U.S. PATENT DOCUMENTS 5,713,504 A * 2/1998 Arai et al. .................. 226/183
6,343,787 B1 * 2/2002 Kato et al. .................. 271/274

FOREIGN PATENT DOCUMENTS

JP 9-211914 8/1997
JP 2000-206638 7/2000

* cited by examiner

Primary Examiner—Huan Tran
(74) Attorney, Agent, or Firm—Sughrue Mion, PLLC

(57) ABSTRACT

An image recording apparatus for exposing a photosensitive material includes two pairs of nip rollers. One pair of nip rollers is disposed upstream from a position at which the photosensitive material is exposed, and the other pair of nip rollers is disposed downstream from the exposure position. When a leading edge of the photosensitive material passes through the upstream pair of nip rollers, both pairs of nip rollers are moved into a position at which to nip the photosensitive material to prevent the photosensitive material from becoming jammed. When the leading edge of the photosensitive material passes through the downstream pair of nip rollers, the pairs of nip rollers are moved out of the nipping position to allow edges substantially parallel to a conveyance path of the photosensitive material to be aligned in the direction substantially orthogonal to the conveyance path.

23 Claims, 9 Drawing Sheets

IMAGE RECORDING APPARATUS AND METHOD

BACKGROUND OF THE INVENTION

1. Field of the Invention

The present invention relates to an image recording apparatus and a method in which a photosensitive material is exposed to form an image thereon.

2. Description of the Related Art

In recent years, digital photoprinters have been practically utilized as printing apparatus that utilize digital exposure. In a printing apparatus, initially, an image recorded on a film is photoelectrically read and the read image is converted to a digital signal. Thereafter, the image that has been converted to the digital signal is subjected to various image processing, whereby image data for recording is generated. A photosensitive material is then scan-exposed with recording light modulated in accordance with the image data to record the image (latent image) on the photosensitive material. Finally, the photosensitive material is developed and processed, and outputted as a print (photograph).

In a digital photoprinter, an image recorded on a film is photoelectrically read and gradation correction is carried out by processing the read image (i.e., the digital signal) to determine exposure conditions. Therefore, editing of a print image, such as synthesizing many images or dividing images, and various types of image processing, including color/density adjustment and edge enhancement, can be performed freely. Namely, a print that has been image-processed freely in accordance with the application to which it to be put can be outputted. Image data for print images can also be supplied to a computer or the equivalent, and stored in a recording medium such as a floppy disk. Moreover, the digital photoprinter can output prints having better resolution, color/density reproducibility and image quality than conventional prints which are directly exposed.

The digital photoprinter basically comprises an input unit, which includes a scanner (image reading apparatus) and an image processing apparatus, and an output unit, which includes a printing apparatus (image recording apparatus) and a developing apparatus. In the scanner, light transmitted through an image recorded on a film is photoelectrically read by an image sensor such as a CCD sensor, and transmitted to the image processing apparatus as image data (image data signal) for the film. In the image processing apparatus, the image data is subjected to predetermined image processing, and the processed image data is transmitted to the printing apparatus as output image data (exposure conditions) for image recording. When the printing apparatus uses light beam scan-exposure, a light beam which has been modulated in accordance with the supplied image data is deflected in a main scanning direction, and a photosensitive material is scan-conveyed in a sub-scanning direction orthogonal to the main scanning direction. In this manner, the photosensitive material is scan-exposed with the light beam to form a latent image, and a back print is recorded. In the developing apparatus, the exposed photosensitive material is subjected to predetermined development and processed, whereby a print on which the image recorded on the film has been reproduced is formed.

Image formation is continuously repeated in this manner by main-scanning with a light beam the elongated photosensitive material, which is wound in a roll, while conveying the photosensitive material in the sub-scanning direction. The photosensitive material is then developed and cut into a predetermined length to make a print.

In the image recording apparatus of the digital photoprinter, a pair of conveyance rollers is disposed both upstream and downstream (i.e., in the direction that the photosensitive material is conveyed) from a position at which the photosensitive material is exposed (hereinafter, may be referred to as exposure position). The photosensitive material nipped between the conveyance rollers during exposure to ensure that the photosensitive material is flat, so that an image can be accurately formed on the photosensitive material.

In this case, because the two pairs of conveyance rollers do not move into a position at which to nip the photosensitive material until a leading edge of the photosensitive material has passed through the downstream pair of conveyance rollers and the photosensitive material has reached a position at which exposure can be conducted, misregistration of the photosensitive material due to impact of the photosensitive material against conveyance rollers already predisposed in a nipping position is prevented. After the leading edge of the photosensitive material has passed through the downstream pair of conveyance rollers, the two pairs of conveyance rollers nip the photosensitive material as the photosensitive material is exposed, whereby the photosensitive material is nipped at a predetermined position to accurately form an image on the photosensitive material.

However, since the lengthy photosensitive material which is wound in a roll, the photosensitive material tends to curl in the conveyance direction. Therefore, the photosensitive material can become jammed at the exposure position when the leading edge of the photosensitive material passes through the upstream pair of conveyance rollers and proceeds between the pair of downstream conveyance rollers.

Namely, in the conventional image recording apparatus, there is a drawback that an image cannot be accurately formed on the photosensitive material.

SUMMARY OF THE INVENTION

In view of the above facts, it is an object of the present invention to provide an image recording apparatus and a method with which image formation can be accurately conducted.

A first aspect of the present invention is an image recording apparatus for exposing a photosensitive material to record an image on the photosensitive material, comprising a nipping and conveyance arrangement for aiding in conveying the photosensitive material along a conveyance path in the image recording apparatus, the nipping and conveyance arrangement comprising: two pairs of conveyance rollers mountable in the image recording apparatus, with one pair disposed upstream from an exposure position relative to conveyance direction of the photosensitive material along the conveyance path during exposure, and the other pair disposed downstream from the exposure position, in which the pairs of conveyance rollers nip and convey the photosensitive material during exposure, at least the upstream pair of conveyance rollers nipping at least a leading edge of the photosensitive material when the photosensitive material passes through the upstream pair of conveyance rollers and the pairs of conveyance rollers releasing the photosensitive material, at least momentarily, after the leading edge has passed through the downstream pair of conveyance rollers.

According to the first aspect of the invention, the two pairs of conveyance rollers are moved into a position at which to nip the photosensitive material when at least the leading edge of the photosensitive material passes through the upstream pair of conveyance rollers. Therefore, curling of the photosensitive material reduced by the upstream pair of conveyance rollers nipping at least the leading edge of the photosensitive material. Moreover, it is possible to prevent the photosensitive material from becoming jammed in the image recording apparatus, which occurs when the photosensitive material is conveyed between the upstream pair of conveyance rollers and the downstream pair of conveyance rollers, so that the leading edge of the photosensitive material reliably advances between the downstream pair of conveyance rollers. When the leading edge of the photosensitive material has passed through the downstream pair of conveyance rollers, the two pairs of conveyance rollers are temporarily moved out of the nipping position (i.e., the two pairs of conveyance rollers temporarily release the photosensitive material) to enable edges substantially parallel to the conveyance path of the photosensitive material to be aligned in the direction substantially orthogonal to the conveyance path. After the photosensitive material has been aligned in the direction substantially orthogonal to the conveyance path, the two pairs of conveyance rollers are moved back into the nipping position to once again nip the photosensitive material at the point in time when exposure can be conducted. Thus, the accurately positioned photosensitive material is nipped between the two pairs of conveyance rollers during exposure to ensure that the photosensitive material is flat, so that an image can be accurately formed on the photosensitive material.

Preferably, in the first aspect of the present invention, an alignment section for aligning edges substantially parallel to the conveyance path of the photosensitive material in a direction substantially orthogonal to the conveyance path, is disposed upstream from the two pairs of conveyance rollers.

When the alignment section is disposed upstream from the two pairs of conveyance rollers, alignment in the direction substantially orthogonal to the conveyance path of the photosensitive material is interrupted because the pairs of conveyance rollers are moved into the nipping position when the leading edge of the photosensitive material passes through the upstream pair of conveyance rollers. For this reason, the two pairs of conveyance rollers are temporarily moved out of the nipping position (i.e., the two pairs of conveyance rollers temporarily release the photosensitive material) after the leading edge of the photosensitive material passes through the downstream pair of conveyance rollers, to thereby enable alignment of the edges of the photosensitive material in the direction substantially orthogonal to the conveyance path to be resumed and completed. Thereafter, the two pairs of conveyance rollers are moved back into the nipping position to once again nip the photosensitive material during exposure, whereby the photosensitive material is accurately positioned in the direction substantially orthogonal to the conveyance path and an image can be satisfactorily formed on the photosensitive material.

More preferably, in the first aspect of the present invention, the two pairs of conveyance rollers release the photosensitive material when the photosensitive material is rewound.

Conventionally, when the photosensitive material is long, it is not possible to correct the direction in which the photosensitive material advances if the photosensitive material has advanced obliquely and been nipped by the pairs of conveyance rollers, even if the photosensitive material is rewound. Consequently, the edges of the photosensitive material may sustain damage by being slid against guides on the direction orthogonal to the conveyance path. However, in the present invention, by allowing the pairs of conveyance rollers to release the photosensitive material (i.e., by moving the conveyance rollers out of the nipping position) when the photosensitive material is rewound, the photosensitive material is freed so that its position (direction of advancement) can be corrected and damage to the photosensitive material is avoided.

A second aspect of the present invention is an image recording method for exposing a photosensitive material to record an image on the photosensitive material, the image recording method comprising a method for reducing jamming of photosensitive material in an image recording apparatus used for image exposure of the photosensitive material, the method for reducing jamming of photosensitive material comprising the steps of: (a) conveying the photosensitive material along a conveyance path in the image recording apparatus, past at least one roller that is located upstream from an exposure position, relative to conveyance direction of the photosensitive material during image exposure of the photosensitive material; (b) nipping the photosensitive material with that at least one roller after the leading edge of the photosensitive material has been conveyed past that at least one roller on the conveyance path, and also after the leading edge of the photosensitive material has been conveyed past that at least one roller, positioning at least the other roller downstream from the exposure position at a location which will nip the photosensitive when the photosensitive material is conveyed past that at least one other roller; and (c) positioning the at least one and the at least one other rollers at locations that do not nip the photosensitive material after the leading edge of the photosensitive material has been conveyed past that at least one other roller on the conveyance path.

According to the second aspect of the invention, the two pairs of conveyance rollers are moved into a position at which to nip the photosensitive material when at least the leading edge of the photosensitive material passes through the upstream pair of conveyance rollers. Therefore, curling of the photosensitive material reduced by the upstream pair of conveyance rollers nipping at least the leading edge of the photosensitive material. Moreover, it is possible to prevent the photosensitive material from becoming jammed in the image recording apparatus, which occurs when the photosensitive material is conveyed between the upstream pair of conveyance rollers and the downstream pair of conveyance rollers, so that the leading edge of the photosensitive material reliably advances between the downstream pair of conveyance rollers. When the leading edge of the photosensitive material has passed through the downstream pair of conveyance rollers, the two pairs of conveyance rollers are temporarily moved out of the nipping position (i.e., the two pairs of conveyance rollers temporarily release the photosensitive material) to enable edges of the photosensitive material to be aligned in the direction substantially orthogonal to the conveyance path. After the photosensitive material has been aligned in the direction substantially orthogonal to the conveyance path, the two pairs of conveyance rollers are moved back into the nipping position to once again nip the photosensitive material at the point in time when exposure can be conducted. Thus, the accurately positioned photosensitive material is nipped between the two pairs of conveyance rollers during exposure to ensure that the photosensitive material is flat, so that an image can be accurately formed on the photosensitive material.

Preferably, in the second aspect of the present invention, the image recording method further comprises a step of releasing the photosensitive material from being nipped by the two pairs of conveyance rollers when the photosensitive material is rewound.

Conventionally, when the photosensitive material is long, it is not possible to correct the direction in which the photosensitive material advances if the photosensitive material has advanced obliquely and been nipped by the pairs of conveyance rollers, even if the photosensitive material is rewound. Consequently, the edges of the photosensitive material may sustain damage by being slid against guides on the direction orthogonal to the conveyance path. However, in the present invention, by allowing the pairs of conveyance rollers to release the photosensitive material (i.e., by moving the conveyance rollers out of the nipping position) when the photosensitive material is rewound, the photosensitive material is freed so that its position (direction of advancement) can be corrected and damage to the photosensitive material is avoided.

A third aspect of the present invention is an apparatus for aiding in conveying photosensitive material along a conveyance path in an image recording device for image exposure, the apparatus comprising: (a) a first pair of conveyance rollers mountable across the conveyance path from one another, the conveyance rollers being movable relative to each other towards and away from each other from a location that does not nip the photosensitive material when the photosensitive material is on the conveyance path between the first conveyance rollers, and another location nipping the photosensitive material upstream from an exposure position with respect to conveyance direction of the photosensitive material during image exposure; (b) a second pair of conveyance rollers mountable across the conveyance path from one another, the second conveyance rollers being movable relative to each other towards and away from each other from a location that does not nip the photosensitive material when the photosensitive material is on the conveyance path between the second pair of conveyance rollers, and another location nipping the photosensitive material downstream from the exposure position with respect to conveyance direction of the photosensitive material during image exposure; and (c) a control arrangement which moves the first conveyance rollers towards each other to the location nipping the photosensitive material upstream from the exposure position when a leading edge of the photosensitive material has passed through the first pair of conveyance rollers, and when the leading edge of the photosensitive material has passed through the second pair of conveyance rollers, the control arrangement moves the first and second conveyance rollers to locations that do not nip the photosensitive material.

DESCRIPTION OF THE PREFERRED EMBODIMENT

Hereinafter, an image recording apparatus and a method of the present invention will be described in detail on the basis of a preferred embodiment shown in attached drawings. First, the overall structure of the image recording apparatus will be described, and then two pairs of nip (conveyance) rollers will be described.

Overall Structure of Image Recording Apparatus

Figure 1:
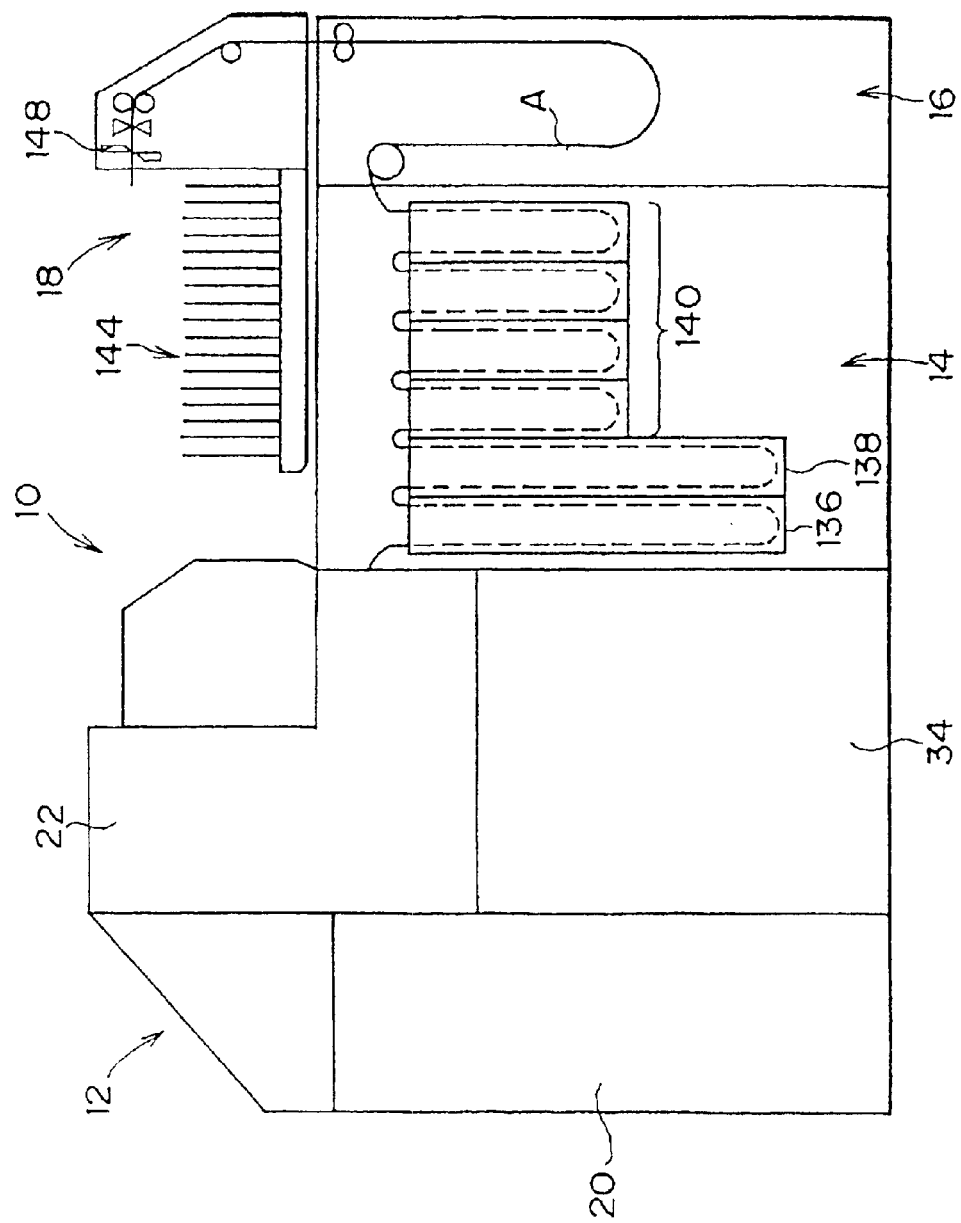
FIG. 1 is a schematic explanatory view of an image recording apparatus according to an embodiment of the present invention.

FIG. 1 illustrates an image recording apparatus 10 that is mainly used in a digital photoprinter. The image recording apparatus 10 scan-exposes a photosensitive material A with a light beam to form a latent image, based on exposure conditions (image recording conditions) which have been determined by a setup apparatus in accordance with an image read by an image reading apparatus such as a film scanner, develops and processes the photosensitive material A, and outputs a print on which the image on the film is recorded. The image recording apparatus 10 basically comprises an image recording section 12, a developing section 14, a drying section 16, a discharging section 18, and an electrical equipment section 20 that accommodates a control circuit board and a power source.

Figure 2:
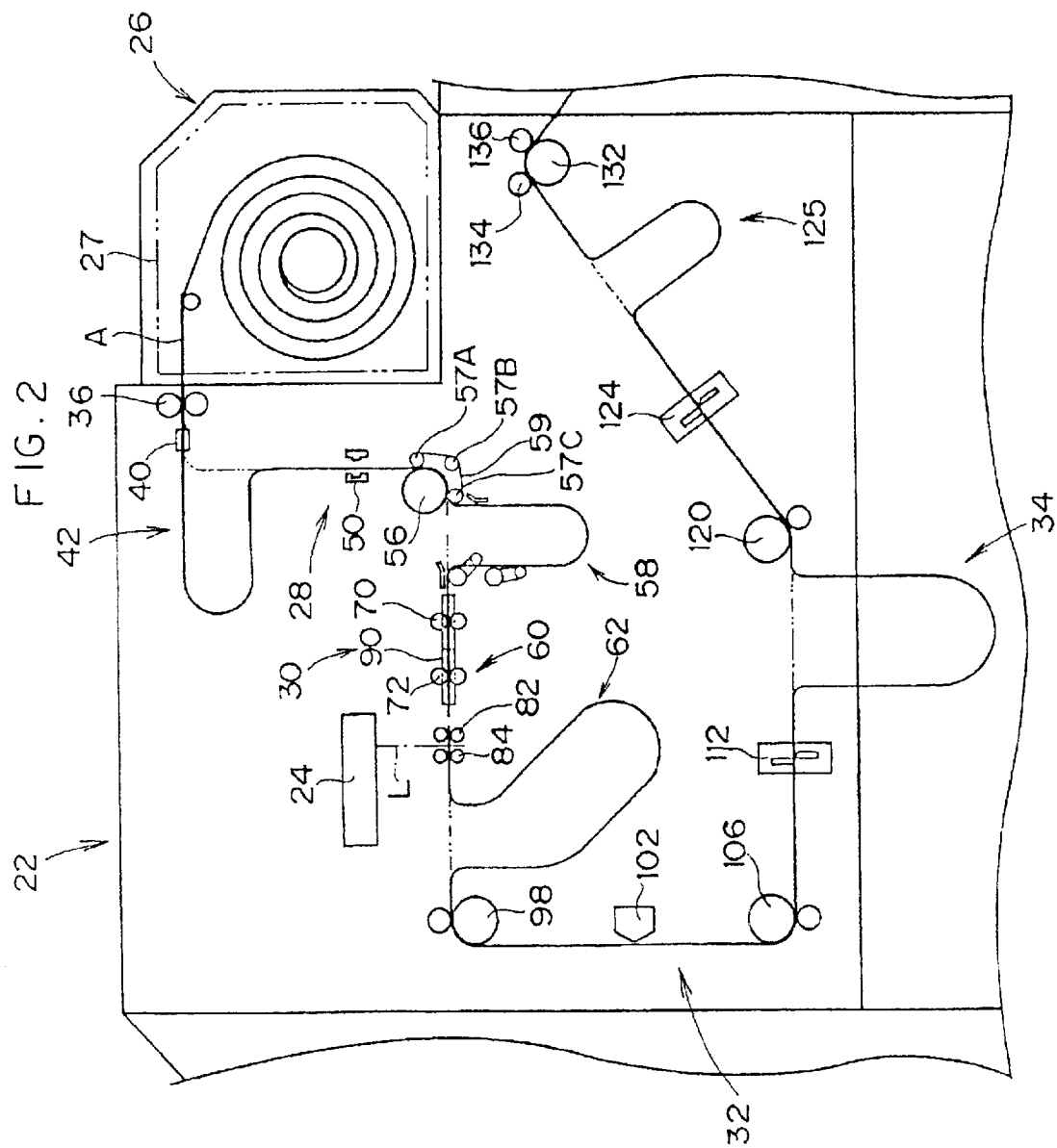
FIG. 2 is a schematic side view of a printing/conveyance device according to the embodiment of the present invention.

As shown in FIG. 2, the image recording section 12 includes a printing/conveyance device 22 and a light beam scanner 24.

While the photosensitive material A, which is wound in a roll, is pulled out from a photosensitive material magazine 27 and conveyed to the developing section 14 along a predetermined path, the printing/conveyance device 22 records image position information, image-exposes the photosensitive material A and forms back prints on the backside of the photosensitive material A. The printing/conveyance device 22 has a photosensitive material supplying section 26, an image position information creating section 28 which records image position information, an exposure section 30, a back-printing section 32, a reservoir 34, and a conveyor which conveys the photosensitive material A along a predetermined path through these sections.

The photosensitive material supplying section 26 is loaded with the photosensitive material magazine 27, which accommodates in a light-shielding housing the photosensitive material A wound in a roll. The photosensitive material supplying section 26 is disposed on the printing/conveyance device 22 and at a side of an exposure device composed of the exposure section 30 and the light beam scanner 24.

A pair of pull-out rollers 36 for pulling out the photosensitive material A from the photosensitive material magazine 27, a guide member 40 for guiding the photosensitive material A in a direction substantially orthogonal to the conveyance path, and a first loop-forming section 42 which forms a U-shaped loop for the photosensitive material A, are disposed adjacent to the photosensitive material magazine 27.

The pair of pull-out rollers 36 freely nip and release the photosensitive material A by using an unillustrated nipping/releasing mechanism.

An unillustrated mechanism adjusts the width of the guide member 40 based on the size (width) of the photosensitive material A.

The first loop-forming section 42 forms a loop (slackness) in the photosensitive material A, whereby variation in movement of the photosensitive material A due to the photosensitive material A being conveyed or stopped at the image position information creating section 28 disposed downstream from the first loop-forming section 42 is absorbed.

The image position information creating section 28 includes a puncher 50 for punching a hole in the photosensitive material A and is disposed downstream from the first loop-forming section 42. The image position information creating section 28 creates the image position information on the photosensitive material A, such as positional information (so-called frame information) per print or positional information (so-called sort information) per set unit number of prints (e.g., one 24-exposure photographic film or one 36-exposure photographic film), for cutting the photosensitive material A at the discharging section 18 and exposure and back printing.

The exposure section 30 is disposed downstream from the image position information creating section 28, with a conveyance roller 56 and an endless belt 59 entrained about rollers 57A to 57C being disposed between the image position information creating section 28 and the exposure section 30.

The exposure section 30 includes a second loop-forming section 58, a sub-scanning/conveyance section 60 and a third loop-forming section 62.

The sub-scanning/conveyance section 60 includes two pairs of registration rollers 70 and 72 and a guide member 90, which guide the photosensitive material A to a position at which the photosensitive material A is exposed (hereinafter, may be referred to as an exposure position). The sub-scanning/conveyance section 60 also includes two pairs of nip rollers 82 and 84, which convey the photosensitive material A to the exposure position and are disposed downstream from the pairs of registration rollers 70 and 72. The light beam scanner 24 scan-exposes in a main scanning direction the photosensitive material A while the photosensitive material A is conveyed by the pairs of nip rollers 82 and 84 in a sub-scanning direction, whereby the photosensitive material A is exposed two-dimensionally.

The second loop-forming section 58 and the third loop-forming section 62 are respectively provided upstream and downstream from the exposure position (the sub-scanning/conveyance section 60). The second loop-forming section 58 and the third loop-forming section 62 eliminate adverse effects such as so-called back tension and tension caused by the upstream and downstream conveyance rollers when the photosensitive material A is sub-scanned/conveyed in the sub-scanning/conveyance section 60, whereby the photosensitive material A is sub-scanned/conveyed with high precision.

The back-printing section 32 is disposed downstream from the third loop-forming section 62, with a conveyance roller 98 being disposed between the third loop-forming section 62 and the back-printing section 32.

At the back-printing section 32, various data, such as dates photographs represented by images on an original film were taken and dates images were recorded on the photosensitive material A, is recorded on a back surface of the photosensitive material A by a printer 102.

A first cutter 112 and the reservoir (fourth loop-forming section) 34 are disposed downstream from the back-printing section 32, with a conveyance roller 106 being disposed between the back-printing section 32 and the first cutter 112.

The first cutter 112 is not used in an ordinary operational state, and cuts the photosensitive material A when all the exposed photosensitive material A accommodated in the reservoir 34 is discharged after being exposed.

The reservoir 34 eliminates differences between the processing speed of the image recording section 12 and that of the developing section 14 so that prints can be formed with high efficiency.

A second cutter 124 and a fifth loop-forming section 125 are disposed downstream from the reservoir 34, with a conveyance roller 120 being disposed between the reservoir 34 and the second cutter 124.

The second cutter 124 cuts the photosensitive material A when any trouble arises. For example, when an amount of the photosensitive material A accommodated in the reservoir 34 is equal to or less than a predetermined amount, or when any troubles occur at the developing section 14, the second cutter 124 cuts the photosensitive material A. Consequently, it is possible to prevent the exposed photosensitive material A accommodated in the reservoir 34 from being adversely affected and to prevent damage to the conveyors of the printing/conveyance device 22 caused by the photosensitive material A being pulled excessively towards the developing section 14.

The fifth loop-forming section 125 ultimately eliminates effects on the photosensitive material A due to any difference between the processing speed of the printing/conveyance device 22 and that of the developing section 14, and variation in movement of the photosensitive material A due to conveyance or stop of conveyance of the photosensitive material A by a conveyance roller 132 so as to prevent the photosensitive material A from being pulled excessively by the developing section 14 and damaged.

The conveyance roller 132 and nip rollers 134 and 136 are disposed downstream from the fifth loop-forming section 125, and guide the photosensitive material A into the developing section 14.

As shown in FIG. 1, the photosensitive material A reaches the developing section 14 and is fed into the drying section 16 after passing through a developing tank 136, a fixing tank 138 and a rinsing tank 140. Then, the photosensitive material A is cut into predetermined lengths by a cutter 148 at the discharging section 18 to make finished prints. The finished prints are then accommodated in a sorter 144.

When a leading edge of the photosensitive material A reaches each of the first to fifth loop-forming sections 42 to 125, the photosensitive material A is linearly guided downstream by unillustrated guide devices, as shown with two-dotted chain lines.

Sub-Scanning/Conveyance Section

The sub-scanning/conveyance section 60 of the image recording apparatus 10 having the above structure will now be described in detail.

Figure 4:
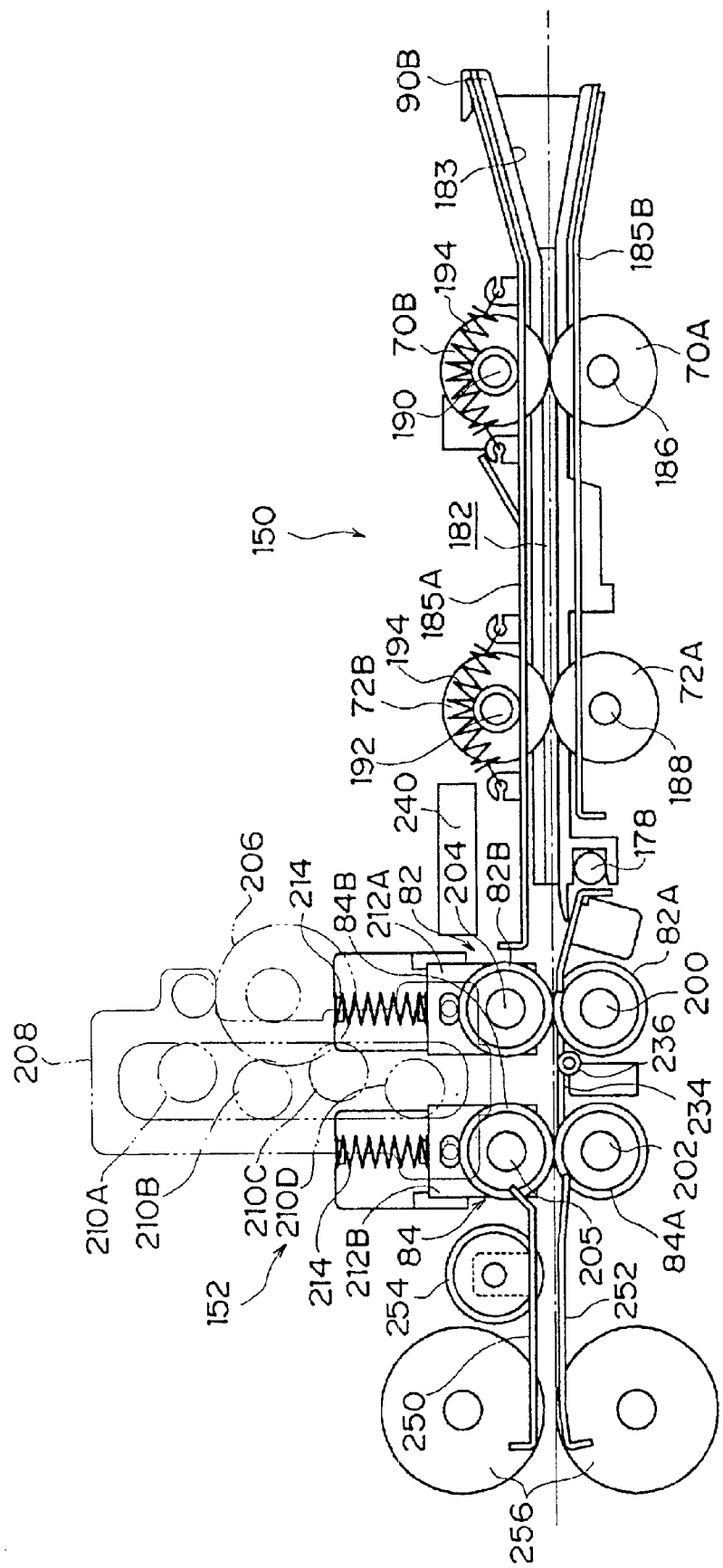
FIG. 4 is a side view showing a sub-scanning/conveyance section according to the embodiment of the present invention.

The sub-scanning/conveyance section 60 basically comprises an alignment section 150 for positioning (aligning) edges of the photosensitive material A, in a direction substantially orthogonal to the conveyance path, before it is exposed, and an exposure/conveyance section 152 for accurately exposing the photosensitive material A that has been positioned in the direction substantially orthogonal to the conveyance path (FIG. 4).

Figure 3:
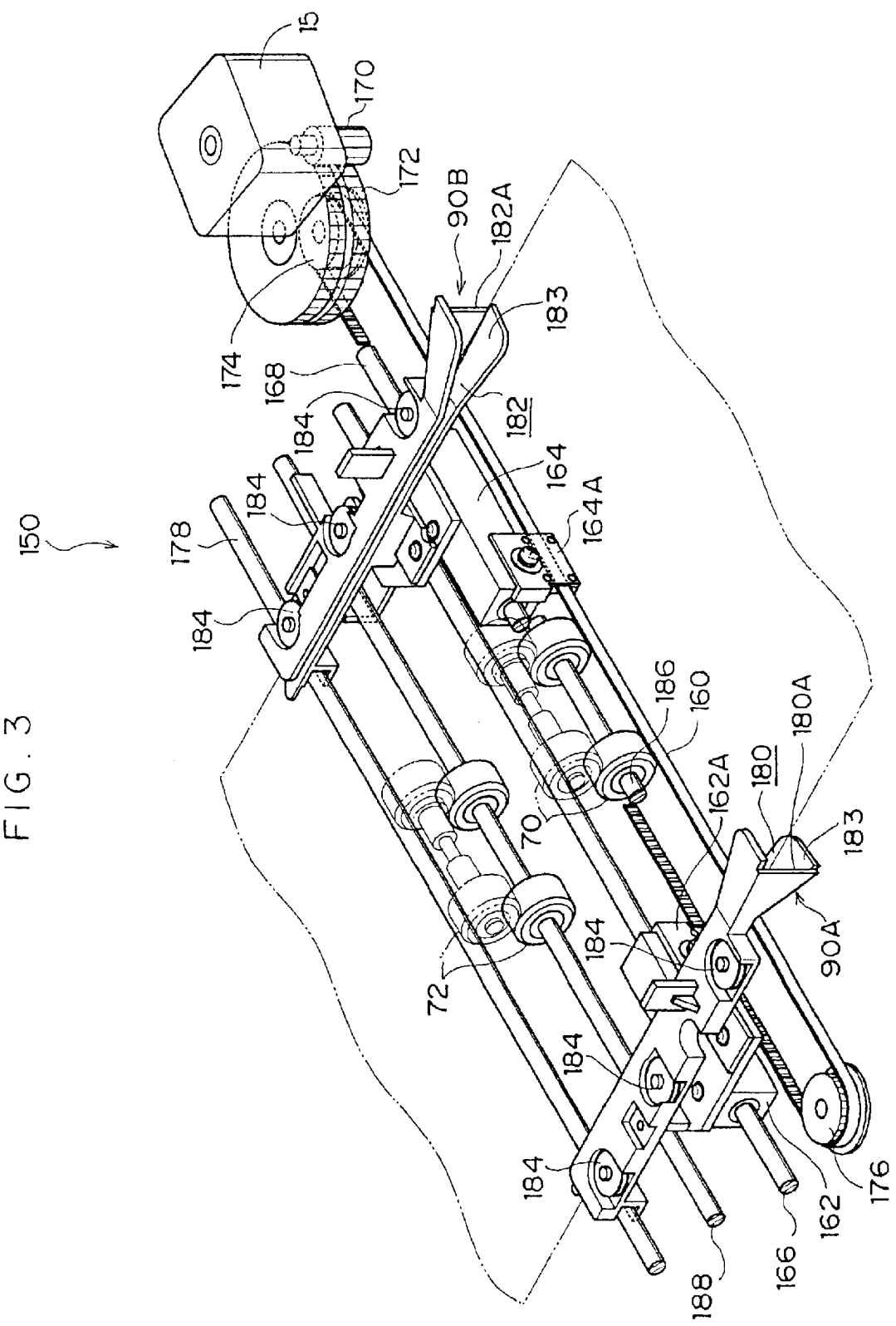
FIG. 3 is a schematic structural view showing an alignment section according to the embodiment of the present invention.

As shown in FIG. 3, the alignment section 150 includes a pair of positioning guides 90A and 90B, which freely move close to and away from each other in the direction substantially orthogonal to the conveyance path, and two pairs of registration rollers 70 and 72 which press the edges substantially parallel to the conveyance path of the photosensitive material A against the positioning guide 90A.

In the positioning guides 90A and 90B, when a motor 158 is driven to move a timing belt 160, sliders 162 and 164, which are meshed with the timing belt 160 by engaging portions 162A and 164A, move along shafts 166 and 168 in opposite directions.

Specifically, a rotational force is transmitted to a first gear 174 via a driving gear 170 and a driven gear 172 of the motor 158, and the timing belt 160 that is wound onto the first gear 174 and a second gear 176 is thereby rotated. When the motor 158 is driven to rotate the timing belt 160, the sliders 162 and 164 (the positioning guides 90A and 90B), which are engaged with opposite sides of the timing belt 160, move close to and away from each other.

Upstream sides of the positioning guides 90A and 90B are supported by the sliders 162 and 164, and downstream sides of the same are slidably supported by a shaft 178. As shown in FIGS. 3 and 4, the positioning guide 90A is disposed with a guide groove 180, and the positioning guide 90B is disposed with a guide groove 182. Each of the guide grooves 180 and 182 has a substantially U-shaped cross-section, and is disposed with a guide portion 183. The guide portions 183 open vertically upstream in the direction in which the photosensitive material A is conveyed, whereby the photosensitive material A can be guided into and by the guide portions 183 from upstream.

Three rollers 184 are provided at each of the positioning guides 90A and 90B along the conveyance direction. The rollers 184 are exposed to vertical surfaces 180A and 182A which form the guide grooves 180 and 182.

Therefore, slide resistance of the edges of the photosensitive material A, which are pressed against the vertical surfaces 180A and 182A of the positioning guides 90A and 90B, can be reduced.

Figure 5:
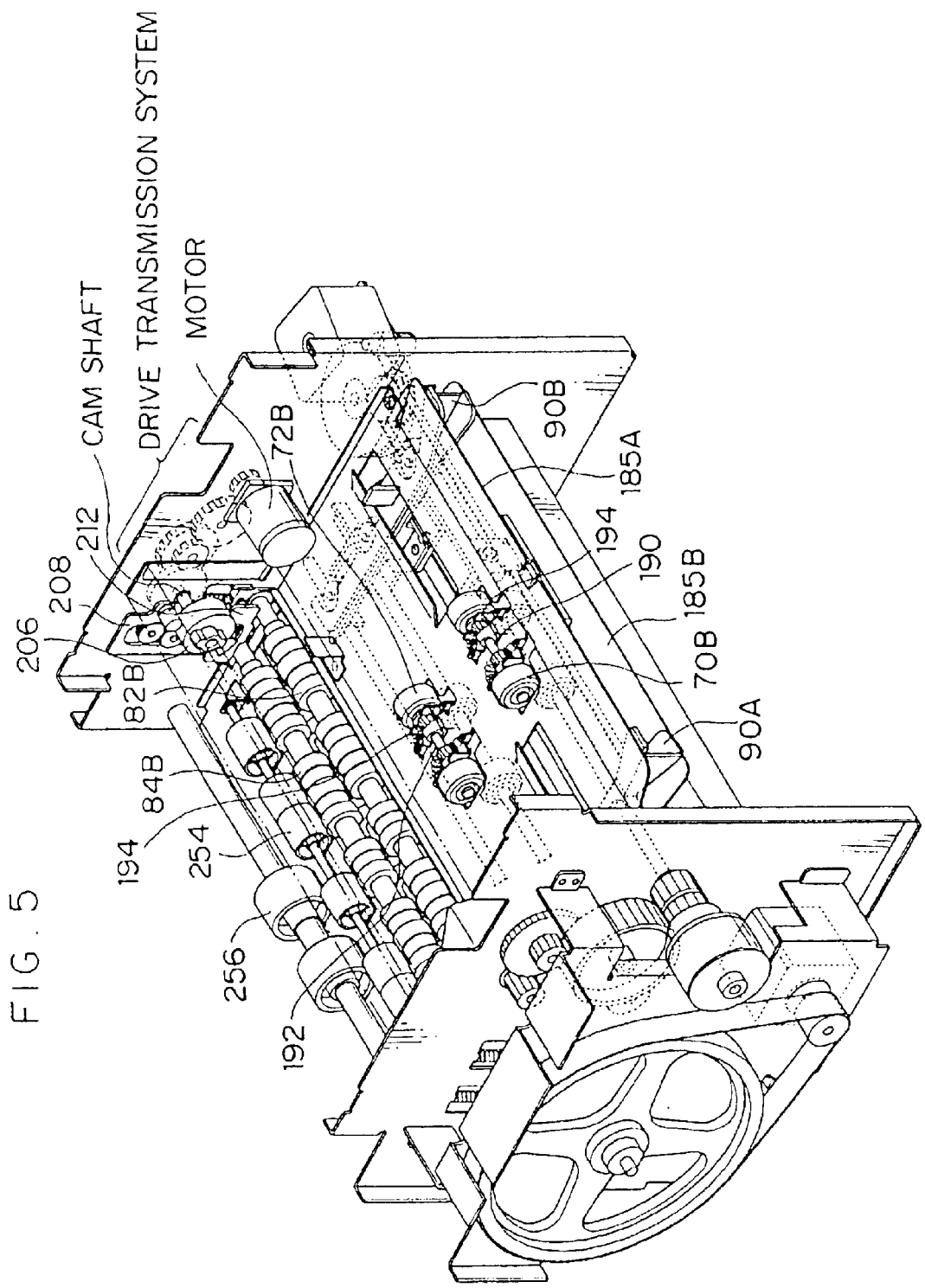
FIG. 5 is a perspective view showing the sub-scanning/conveyance section according to the embodiment of the present invention.

As shown in FIG. 5, guide plates 185A and 185B are disposed above and below the positioning guides 90A and 90B.

As shown in FIGS. 3 and 4, the pairs of registration rollers 70 and 72, which guide the photosensitive material A to the positioning guide 90A, are disposed between the positioning guides 90A and 90B. Specifically, lower rollers 70A and 72A are respectively disposed around driving shafts 186 and 188 and protrude upwardly from the guide plate 185B. As shown in FIG. 4, rotating shafts 190 and 192 of upper rollers 70B and 72B are pivotally supported by the guide plate 185A, and urged downwardly by springs 194. In this manner, the upper rollers 70B and 72B, which protrude downwardly from the guide plate 185A, and the lower rollers 70A and 72A nip the photosensitive material A therebetween. The direction in which the two pairs of registration rollers 70 and 72 rotate is slightly inclined toward the positioning guide member 90A with respect to the conveyance direction. Accordingly, the conveyed photosensitive material A is pressed against the vertical surface 180A of the groove 180 of the positioning guide member 90A, to thereby align the photosensitive material A in the direction substantially orthogonal to the conveyance path.

Next, the exposure/conveyance section 152, which is disposed downstream from the alignment section 150, will be described.

The exposure/conveyance section 152 is disposed with the two pairs of nip rollers 82 and 84. The pairs of nip rollers 82 and 84 respectively comprise lower rollers 82A and 84A, which are disposed around shafts 200 and 202 that serve as driving shafts, and upper rollers 82B and 84B which, together with shafts 204 and 205, vertically move close to and away from the lower rollers 82A and 84A to nip and release the photosensitive material A.

A mechanism for raising and lowering each of the upper rollers 82B and 84B is disposed at each side, in the direction orthogonal to the conveyance path, of the exposure/conveyance section 152. Since the mechanism for each of the upper rollers 82B and 84B is the same, description will be given of only one of the mechanisms, with reference to the upper roller 82B.

The exposure/conveyance section 152 includes a rotating eccentric cam 206, a plate 208 and a sliding member 212A that is engaged with the plate 208. Urging force of a spring 214 ordinarily urges the sliding member 212A downwards, to thereby urge the upper roller 82B downward (to nip the photosensitive material A). However, depending on the direction in which the eccentric cam 206 rotates, the plate 208 is raised or lowered along guide rollers 210A to 210D. When the plate 208 is raised, the sliding member 212A is also raised counter to the urging force of the spring 214, whereby the upper roller 82B is no longer urged downwards and the photosensitive material A is released (from being nipped). When the plate 208 is lowered, the sliding member 212A is also lowered in the same direction that the urging force of the spring 214 is applied to the sliding member 212A, whereby the upper roller 82B is urged downwards.

Specifically, the shaft 204 of the upper roller 82B is axially supported by the sliding member 212A so as to freely rotate. The sliding member 212A is disposed in an opening 220 formed in a side-wall plate 218, and is normally urged downwards by the spring 214. A long hole 222 that extends in the conveyance direction is formed in the sliding member 212A, and a pin 224 of the plate 208 is inserted into the long hole 222 so that the sliding member 212A and the plate 208 engage with each other. A guide member 226 which vertically guides the sliding member 212A is also disposed in the opening 220 (FIG. 6).

Next, the plate 208 which is raised and lowered together with the sliding members 212A and 212B will be described.

Figure 6:
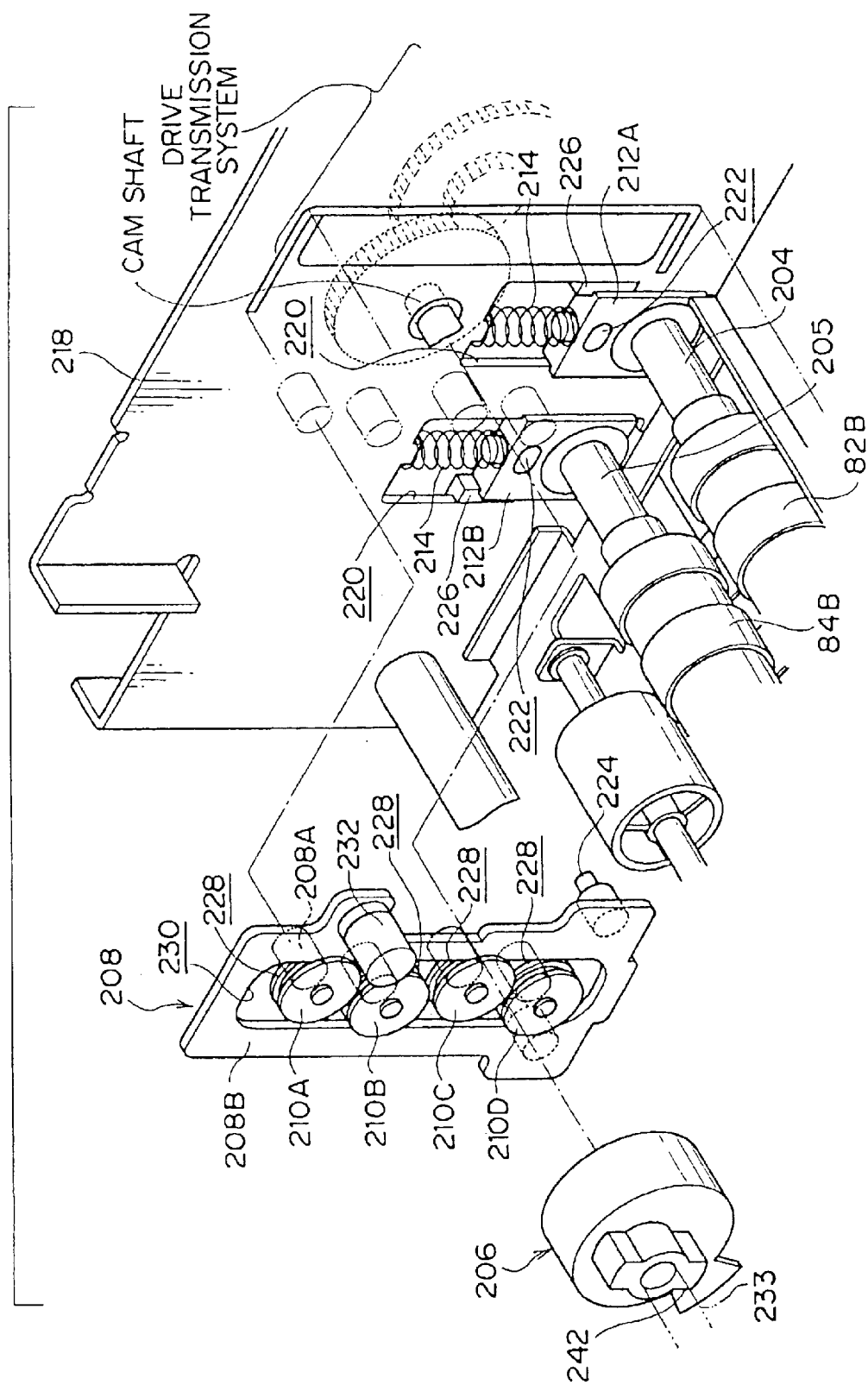
FIG. 6 is a partially exploded perspective view of an exposure/conveyance section according to the embodiment of the present invention.

As shown in FIG. 6, two pins 224 protrude from a lower portion of the plate 208, and are respectively inserted into the corresponding long holes 222 of the sliding members 212A and 212B, so that the sliding members 212A and 212B integrally move together with the plate 208.

The guide rollers 210A to 210D, which guide the plate 208 up and down, are vertically disposed relative to one another, with rotational axes of adjacent guide rollers being alternatingly disposed upstream and downstream in the conveyance direction (so that the overall disposition of the guide rollers resembles a zigzag). A V-shaped groove is formed around the periphery of each of the guide rollers 210A to 210D. Additionally, the plate 208 is disposed with an opening 230, which extends vertically in a substantially central area of the plate 208, with an upstream-side portion 208A and a downstream-side portion 208B respectively disposed at upstream and downstream sides of the opening 230. The upstream-side portion 208A fits into the V-shaped grooves 228 of the guide rollers 210A and 210C, and the downstream-side portion 208B fits into the V-shaped grooves 228 of the guide rollers 210B and 210D. As a result, the plate 208 is raised and lowered by the upstream-side portion 208A being guided by the guide rollers 210A and 210C and the downstream-side portion 208B being guided by the guide rollers 210B and 210D.

Further, an engaging pin 232 that protrudes inwardly is formed at an upper portion of the plate 208. The engaging pin 232 abuts against the eccentric cam 206, which is pivotally supported by the side-wall plate 218 so as to freely rotate, and the plate 208 is raised and lowered by rotation of the eccentric cam 206. The eccentric cam 206 shares the same shaft as another unillustrated eccentric cam, so that the eccentric cams are synchronously rotatable.

When the plate 208 is raised or lowered by rotation of the eccentric cam 206 and guided by the guide rollers 210A to 210D, the sliding members 212A and 212B, which are engaged with the plate 208, are also raised or lowered. Therefore, when the plate 208 is raised, the upper rollers 82B and 84B that are ordinarily urged downwards by the springs 214 move away from the lower rollers 82A and 84A to release the photosensitive material A. When the plate 208 lowered, the upper rollers 82B and 84B are urged downwards by the springs 214 close to the lower rollers 82A and 84A, whereby the photosensitive material A is nipped between the respective pairs of upper and lower rollers.

As shown in FIG. 4, a plate 234 is disposed between the lower rollers 82A and 84A, to prevent the leading edge of the photosensitive material A from intruding into the space between the lower rollers 82A and 84A and becoming jammed. In order to reduce sliding friction of the photosensitive material A, a roller 236 that protrudes from the plate 234 is also disposed.

A sensor 240 for detecting the leading edge of the photosensitive material A is disposed upstream from the pair of nip rollers 82.

Figure 7:
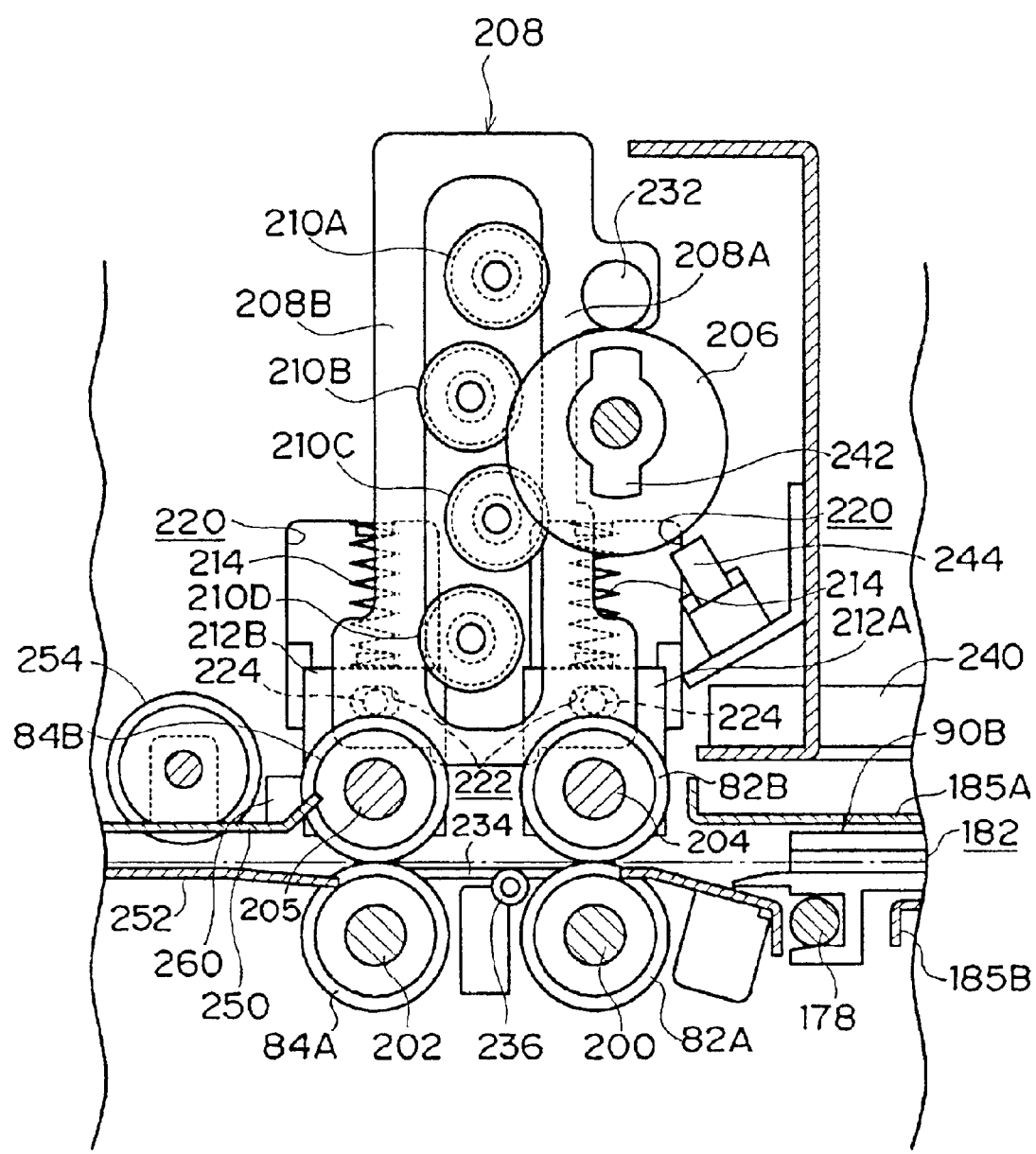
FIG. 7 is an explanatory view of the exposure/conveyance section in a nipping state according to the embodiment of the present invention.

As shown in FIG. 7, a detecting protrusion 242 for sensor detection is formed at the eccentric cam 206, and the amount that the eccentric cam 206 rotates is detected by a sensor 244.

As shown in FIG. 4, upper and lower guide plates 250 and 252, a freely rotatable roller 254 that protrudes downwardly from the upper guide plate 250, and a pair of rollers 256 that are disposed at downstream ends of the guide plates 250 and 252, are disposed downstream from the exposure/conveyance section 152. Since the photosensitive material A is curved at the third loop-forming section 62, these plates and rollers prevent the curvature of the photosensitive material A from affecting the exposure/conveyance section 152.

A sensor 260, which detects the leading edge of the photosensitive material A once it has passed through the pair of nip rollers 84, is disposed downstream from the pair of nip rollers 84.

Operation (image recording method) of the image recording apparatus 10 (the sub-scanning/conveyance section 60) having the above structure will now be described.

Initially, when the magazine 27 is set at the image recording apparatus 10, the drive motor 158 is driven in accordance with the size of the photosensitive material A accommodated in the magazine 27, whereby the distance between the positioning guide members 90A and 90B is adjusted.

Figure 8:
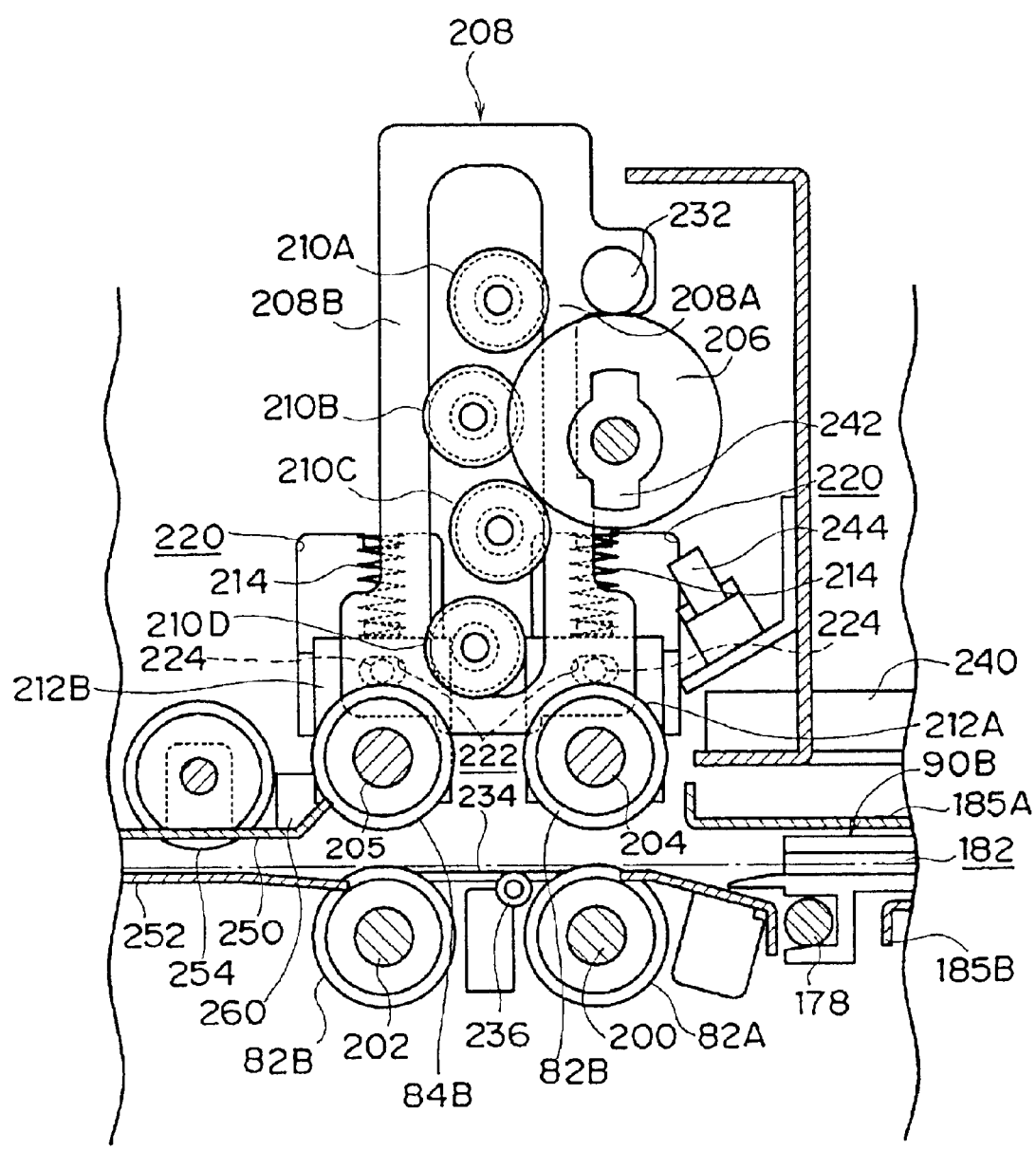
FIG. 8 is an explanatory view of the exposure/conveyance section in a releasing state according to the embodiment of the present invention.
Figure 9:
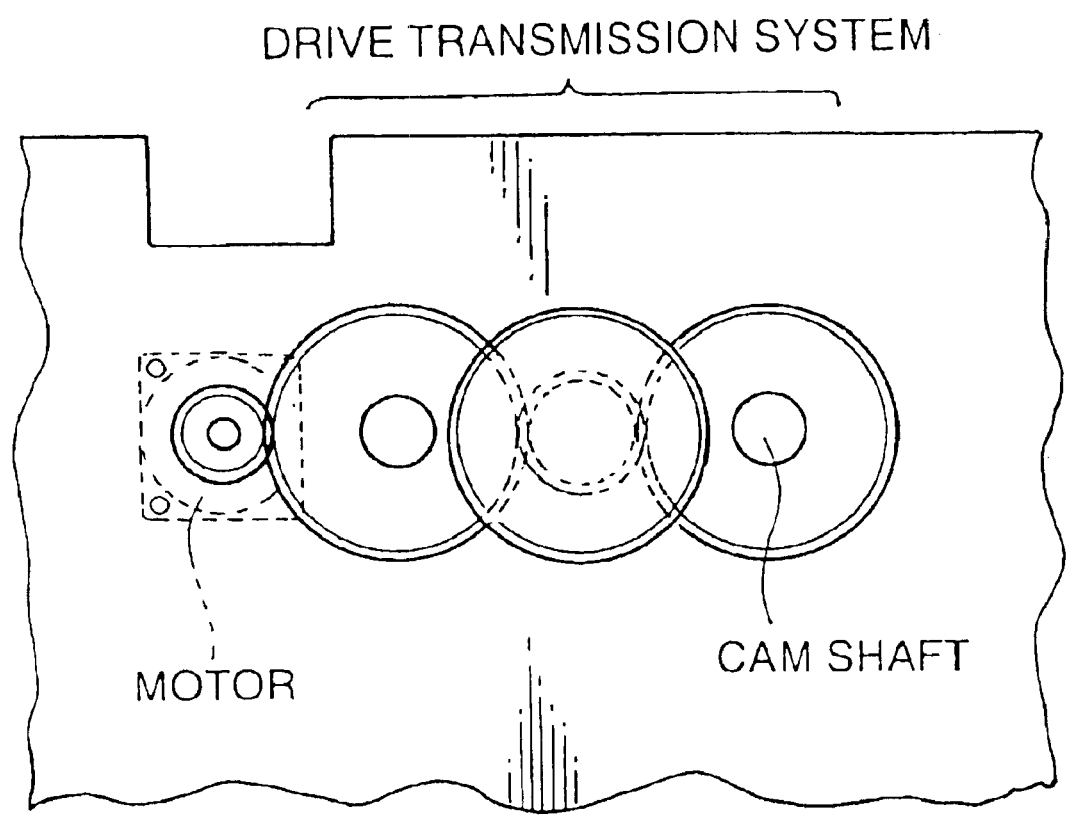
FIG. 9 illustrates the drive transmission portion of FIG. 5, according to an embodiment of the present invention.

At this time, the eccentric cam 206 is located at an upper-limit position (see FIG. 8) and the plate 208 is located at a position of maximum height. Namely, the upper rollers 82B and 84B are separated from the lower rollers 82A and 84A counter to the urging force of the springs 214 (a non-nipping position).

When the photosensitive material A is pulled out from the magazine 27 and has reached the sub-scanning/conveyance section 60, the photosensitive material A is inserted between the upper guide plate 185A and the lower guide plate 185B (and between the positioning guide members 90A and 90B) at the alignment section 150, and pressed against the positioning guide member 90A by the pairs of registration rollers 70 and 72.

When the sensor 240 detects that the leading edge of the photosensitive material A has passed through the alignment section 150, an unillustrated motor is driven so that the eccentric cam 206 is rotatingly moved to a lower-limit position (see FIG. 7). Namely, the plate 208 and the sliding members 212A and 212B are lowered so that the upper rollers 82B and 84B are moved into a position at which to nip the photosensitive material A due to the urging force of the springs 214.

In this state, the leading edge of the photosensitive material A is inserted between and conveyed by the pairs of nip rollers 82 and 84, and conveyed toward the pair of nip rollers 84 as it is being nipped between the pair of nip rollers 82. Therefore, curling of the leading edge of the photosensitive material A is restricted, and the leading edge is reliably inserted between the upper roller 84B and the lower roller 84A. Accordingly, the photosensitive material A is reliably prevented from becoming jammed.

Consequently, when the sensor 260 detects that the leading edge of the photosensitive material A has passed through the pair of nip rollers 84, the motor is driven so that the eccentric cam 206 is rotatingly moved back to the upper-limit position. Thus, the plate 208 raised, and the sliding members 212A and 212B are raised counter to the elastic force of the springs 214. Namely, the upper rollers 82B and 84B are separated from the lower rollers 82A and 84A and release the photosensitive material A.

As a result, the photosensitive material A is freed at the exposure/conveyance section 152, and the edges substantially parallel to the conveyance path of the photosensitive material A can be satisfactorily aligned in the direction substantially orthogonal to the conveyance path by the pairs of registration rollers 70 and 72 at the alignment section 150.

Further, before a position on the photosensitive material A at which exposure is initiated reaches the exposure/conveyance section 152 (i.e., when a predetermined period of time has elapsed after the leading edge of the photosensitive material A is detected by the sensor 240), the eccentric cam 206 is driven by the motor to lower the upper nip rollers 82B and 84B back into the nipping position. As a result, the photosensitive material A is nipped between the pairs of nip rollers 82 and 84. Accordingly, flatness and positional accuracy of the photosensitive material A are ensured at the exposure position, whereby an image can be accurately recorded on the photosensitive material A.

When the photosensitive material A is rewound, the pairs of nip rollers 82 and 84 release the photosensitive material A (i.e., the upper nip rollers 82B and 84B are moved out of the nipping position). Thus, by freeing the photosensitive material A at the exposure/conveyance section 152, the direction in which the photosensitive material A advances (i.e., the position of the photosensitive material A) can easily be corrected, even if the photosensitive material A has advanced obliquely and been nipped by the pairs of nip rollers 82 and 84.

In this manner, in this embodiment, immediately before the leading edge of the photosensitive material A reaches the exposure/conveyance section 152, the pairs of nip rollers 82 and 84 are moved into the nipping position. Accordingly, the leading edge of the photosensitive material A that tends to curl in the conveyance direction can be prevented from becoming jammed between the pair of nip rollers 82 and the pair of nip rollers 84. Further, after the leading edge of the photosensitive material A has passed through the pair of nip rollers 84, the pairs of nip rollers 82 and 84 are moved out of the nipping position, whereby the edges of the photosensitive material A can be easily aligned in the direction substantially orthogonal to the conveyance path at the alignment section 150. Namely, the freed photosensitive material A is pressed against the vertical surface 180A of the positioning guide member 90A by the pairs of registration rollers 70 and 72 to position (align) the photosensitive material A in the direction substantially orthogonal to the conveyance path.

Further, after the photosensitive material A has been positioned in the direction substantially orthogonal to the conveyance path, the photosensitive material A is nipped again between the pairs of nip rollers 82 and 84 when an image recording portion of the photosensitive material A has reached the exposure position (when a predetermined period of time has elapsed after the leading edge of the photosensitive material A is detected by the sensor 240). Accordingly, the photosensitive material A is once again nipped between the two pairs of nip rollers 82 and 84 during exposure to ensure that the photosensitive material A is flat, so that an image can be accurately formed on the photosensitive material A.

In the image recording apparatus and method according to the present invention, an image can be accurately recorded on a photosensitive material.

What is claimed is:

1. An image recording apparatus for exposing a photosensitive material to record an image on the photosensitive material, comprising a nipping and conveyance arrangement for aiding in conveying the photosensitive material along a conveyance path in the image recording apparatus, the nipping and conveyance arrangement comprising:
   two pairs of conveyance rollers mountable in the image recording apparatus, with one pair disposed upstream from an exposure position relative to conveyance direction of the photosensitive material along the conveyance path during exposure, and one other pair disposed downstream from the exposure position, in which the pairs of conveyance rollers nip and convey the photosensitive material during exposure, and;
   a detector detecting a leading edge of the photosensitive material, wherein at least the upstream pair of conveyance rollers nipping at least the leading edge of the photosensitive material when the photosensitive material passes through the upstream pair of conveyance rollers and the pairs of conveyance rollers releasing the photosensitive material, at least momentarily, after the leading edge has passed through the downstream pair of conveyance rollers based on an output of the detector.

2. The image recording apparatus of claim 1, further comprising an alignment section for aligning edges substantially parallel to the conveyance path of the photosensitive material, in a direction substantially orthogonal to the conveyance path, mountable upstream from the two pairs of conveyance rollers.

3. The image recording apparatus of claim 1, wherein the two pairs of conveyance rollers release the photosensitive material when the photosensitive material is rewound.

4. The image recording apparatus of claim 1, said detector comprising at least one sensor for detecting that the leading edge of the photosensitive material has passed through at least one of the two pairs of conveyance rollers, the at least one sensor being disposed in the vicinity of the upstream pair of conveyance rollers.

5. The image recording apparatus of claim 2, wherein the two pairs of conveyance rollers release the photosensitive material when the photosensitive material is rewound.

6. The image recording apparatus of claim 2, wherein the alignment section includes a pair of positioning guides, movable forwards and away from each other in the direction substantially orthogonal to the conveyance path of the photosensitive material, and pairs of registration rollers for pressing the edges substantially parallel to the conveyance path of the photosensitive material against at least one of the positioning guides.

7. The image recording apparatus of claim 6, wherein the alignment section further includes shafts which extend along the direction substantially orthogonal to the conveyance path of the photosensitive material, and sliders which are slidably attached along the shafts, with a portion of each positioning guide supported by each slider and another portion of each positioning guide supported by each shaft.

8. The image recording apparatus of claim 6, further comprising a mechanism for raising and lowering each pair of conveyance rollers, the mechanism being disposed adjacent to each edge substantially parallel to the conveyance path of the photosensitive material, wherein the mechanism includes an eccentric cam, a plate which raises and lowers due to rotation of the eccentric cam, sliding members which are engaged with the plate, and springs for urging the sliding members.

9. The image recording apparatus of claim 2, further comprising a mechanism for raising and lowering each pair of conveyance rollers, the mechanism being disposed adjacent to each edge substantially parallel to the conveyance path of the photosensitive material, wherein the mechanism includes an eccentric cam, a plate which raises and lowers due to rotation of the eccentric cam, sliding members which are engaged with the plate, and springs for urging the sliding members.

10. The image recording apparatus of claim 2, said detector comprising at least one sensor for detecting that the leading edge of the photosensitive material has passed through at least one of the two pairs of conveyance rollers, the at least one sensor being disposed in the vicinity of the upstream pair of conveyance rollers.

11. An image recording method for exposing a photosensitive material to record an image on the photosensitive material, the image recording method comprising a method for reducing jamming of photosensitive material in an image recording apparatus used for image exposure of the photosensitive material, the method for reducing jamming of photosensitive material comprising the steps of:
   (a) conveying the photosensitive material along a conveyance path in the image recording apparatus, past at least one roller that is located upstream from an exposure position, relative to conveyance direction of the photosensitive material during image exposure of the photosensitive material;
   (b) nipping the photosensitive material with said at least one roller after a leading edge of the photosensitive material has been conveyed past said at least one roller on the conveyance path, and also after the leading edge of the photosensitive material has been conveyed past said at least one roller, positioning at least one other roller downstream from the exposure position at a location which will nip the photosensitive material when the photosensitive material is conveyed past said at least one other roller; and
   (c) positioning said at least one and said at least one other rollers at locations that do not nip the photosensitive material after the leading edge of the photosensitive material has been conveyed past said at least one other roller on the conveyance path.

12. The image recording method of claim 11, further comprising the step of positioning said at least one and said at least one other rollers at locations that do not nip the photosensitive material when the photosensitive material is rewound.

13. The image recording method of claim 12, further comprising the step of detecting when the leading edge of the photosensitive material has been conveyed past said at least one roller on the conveyance path.

14. The image recording method of claim 13, further comprising the step of detecting when the leading edge of the photosensitive material has been conveyed past said at least one other roller on the conveyance path.

15. An apparatus for aiding in conveying photosensitive material along a conveyance path in an image recording device for image exposure, the apparatus comprising:
(a) a first pair of conveyance rollers mountable across the conveyance path from one another, the conveyance rollers being movable relative to each other towards and away from each other from a location that does not nip the photosensitive material when the photosensitive material is on the conveyance path between the first conveyance rollers, and another location nipping the photosensitive material upstream from an exposure position with respect to conveyance direction of the photosensitive material during image exposure;
(b) a second pair of conveyance rollers mountable across the conveyance path from one another, the second conveyance rollers being movable relative to each other towards and away from each other from a location that does not nip the photosensitive material when the photosensitive material is on the conveyance path between said second pair of conveyance rollers, and another location nipping the photosensitive material downstream from the exposure position with respect to conveyance direction of the photosensitive material during image exposure; and
(c) a control arrangement which moves the first conveyance rollers towards each other to the location nipping the photosensitive material upstream from the exposure position when a leading edge of the photosensitive material has passed through the first pair of conveyance rollers, and when the leading edge of the photosensitive material has passed through the second pair of conveyance rollers, the control arrangement moves the first and second conveyance rollers to locations that do not nip the photosensitive material.

16. The apparatus of claim 15, wherein the control arrangement includes a rotatably mounted cam, which when the cam is rotated to one angular position, moves each roller towards one other roller in each of the first and the second pair of conveyance rollers, and when the cam is rotated to another angular position, moves each roller away from the other roller in each pair.

17. The apparatus of claim 16, further comprising a pair of positioning guides mountable across the conveyance path from one another in a direction substantially orthogonal to the conveyance path of the photosensitive material, the positioning guides being movable relative to one another, towards and apart from each other.

18. The apparatus of claim 17, wherein the control arrangement includes at least one sensor, which indicates presence of the photosensitive material at a predefined location on the conveyance path.

19. The apparatus of claim 18, wherein the control arrangement moves the positioning guides relative to one another after the leading edge of the photosensitive material has passed through the second pair of conveyance rollers.

20. The apparatus of claim 19, wherein the control arrangement returns the first and second conveyance rollers to locations nipping the photosensitive material upstream and downstream from the exposure position after moving the positioning guides.

21. An image recording apparatus for exposing a photosensitive material to record an image on the photosensitive material, comprising a nipping and conveyance arrangement for aiding in conveying the photosensitive material along a conveyance path in the image recording apparatus, the nipping and conveyance arrangement comprising:
two pairs of conveyance rollers mountable in the image recording apparatus, with one pair disposed upstream from an exposure position relative to conveyance direction of the photosensitive material along the conveyance path during exposure, and one other pair disposed downstream from the exposure position, and
a control means controlling movement of the two pairs of conveyance rollers, wherein at least the upstream pair of conveyance rollers nip at least a leading edge of the photosensitive material when the photosensitive material passes through the upstream pair of conveyance rollers and the pairs of conveyance rollers release the photosensitive material after the leading edge has passed through the downstream pair of conveyance rollers.

22. The apparatus of claim 5 further comprising a driver, said driver receiving the output of the detector and activating movement of the pairs of conveyance rollers based on the output of the detector.

23. The apparatus of claim 22, wherein said driver includes rotatable cams connected to the pairs of rollers to activate movement according to the output of the detector.

* * * * *